(12) United States Patent
Shirokoshi et al.

(10) Patent No.: US 7,686,141 B2
(45) Date of Patent: Mar. 30, 2010

(54) BRAKE-EQUIPPED RETRACTING DEVICE FOR RETRACTABLE MEMBER

(75) Inventors: Norio Shirokoshi, Nagano (JP); Satoru Kimura, Osaka (JP)

(73) Assignees: Harmonic Ad, Inc., Azumino-shi (JP); Matsushita Electric Industrial Co., Ltd., Kadoma-shi (JP)

( * ) Notice: Subject to any disclaimer, the term of this patent is extended or adjusted under 35 U.S.C. 154(b) by 626 days.

(21) Appl. No.: 11/628,422

(22) PCT Filed: May 18, 2006

(86) PCT No.: PCT/JP2006/309929

§ 371 (c)(1),
(2), (4) Date: Nov. 30, 2006

(87) PCT Pub. No.: WO2007/000857

PCT Pub. Date: Jan. 4, 2007

(65) Prior Publication Data

US 2008/0283650 A1    Nov. 20, 2008

(30) Foreign Application Priority Data

Jun. 29, 2005   (JP) .............................. 2005-190555

(51) Int. Cl.
*F16D 47/04*   (2006.01)
(52) U.S. Cl. .................... 188/161; 188/166; 192/12 R; 192/18 B
(58) Field of Classification Search .................... 30/382; 34/58; 188/65.2, 65.4, 166, 77 R, 77 W, 188/161; 192/12 R, 18 B
See application file for complete search history.

(56) References Cited

U.S. PATENT DOCUMENTS 3,776,331 A * 12/1973 Gustafsson .................. 188/166

(Continued)

FOREIGN PATENT DOCUMENTS

JP    04 005142    1/1992

(Continued)

OTHER PUBLICATIONS

Japanese Patent Office Search Report dated Aug. 9, 2006 (1 page).

*Primary Examiner*—Christopher P Schwartz
(74) *Attorney, Agent, or Firm*—Flynn, Thiel, Boutell & Tanis, P.C.

(57)   ABSTRACT

A brake-equipped retracting device (3) returns a liquid crystal display device (1) from a deployed position (1B) to a stored position (1A) using an elastic returning force of a spiral spring (18) that is wound up when the liquid crystal display device (1) is opened by the rotational force of a motor. A braking force for preventing the liquid crystal display device (1) from returning with too much force is applied to an input shaft (17a) of a reducer by having a rope (21) whose tensile force increases and decreases in relation to the opening and closing of the liquid crystal display device (1) be wound around a slip clutch (15) that is connected to the input shaft (17a). In emergency situations such as when the rope (21) breaks, a centrifugal grip (53) of a rotation-restraining mechanism (50) strikes an engagement notch surface (56b) on a fixed side, and the rotation of the input shaft (17a) is forcibly halted. A retracting device for a liquid crystal display device comprising a braking device that has a simple structure, is reliable, is highly safe, and is low in cost can be realized.

8 Claims, 6 Drawing Sheets

U.S. PATENT DOCUMENTS

| | | | |
|---|---|---|---|
| 3,795,985 A * | 3/1974 | Hasebe et al. | 34/58 |
| 5,386,891 A * | 2/1995 | Shea | 188/171 |
| 5,480,009 A * | 1/1996 | Wieland et al. | 188/77 W |
| 5,680,911 A * | 10/1997 | Wang | 187/263 |
| 5,813,123 A * | 9/1998 | Wieland et al. | 30/382 |
| 6,123,134 A * | 9/2000 | Thomas et al. | 160/8 |
| 6,256,078 B1 * | 7/2001 | Ogata | 349/58 |
| 6,424,386 B1 * | 7/2002 | Shimizu | 348/837 |
| 7,293,632 B2 * | 11/2007 | Shirokoshi et al. | 188/77 W |
| 2006/0060439 A1 | 3/2006 | Shirokoshi et al. | |

FOREIGN PATENT DOCUMENTS

| | | |
|---|---|---|
| JP | 08-303496 | 11/1996 |
| JP | 2006 088797 | 4/2006 |

\* cited by examiner

(View from A-A)

(a) (Rotating at a low rate)

(b) (Rotating at a high rate)

FIG. 8

(Rotating at a high rate)

BRAKE-EQUIPPED RETRACTING DEVICE FOR RETRACTABLE MEMBER

TECHNICAL FIELD

The present invention relates to a brake-equipped retracting device whereby a retractable member such as a liquid crystal display device provided to the ceiling of a cabin of an airplane or the like is opened and closed between a stored position and a deployed position.

BACKGROUND ART

Liquid crystal display devices are provided to the ceiling of a cabin of an airplane or the like, are horizontally stored within the ceiling, and are opened to a substantially perpendicularly deployed position when necessary. When the liquid crystal display device is opened, rotational movement output via a motor and reducer is converted to circular movement for turning the liquid crystal display to an deployed position via a link mechanism. A spiral spring is connected to an input shaft or output shaft of the reducer, and is designed to be wound up in association with the opening action of the liquid crystal display device. When the liquid crystal display is to be stored, the motor and the reducer are separated by an electromagnetic clutch, and the returning force of the wound-up spiral spring returns the liquid crystal display device to the stored position. The rotational force of the motor is not relied upon for the closing action because the liquid crystal display device must reliably be returned to a safe stored position without relying on electrical power even in an emergency.

Figure 5:
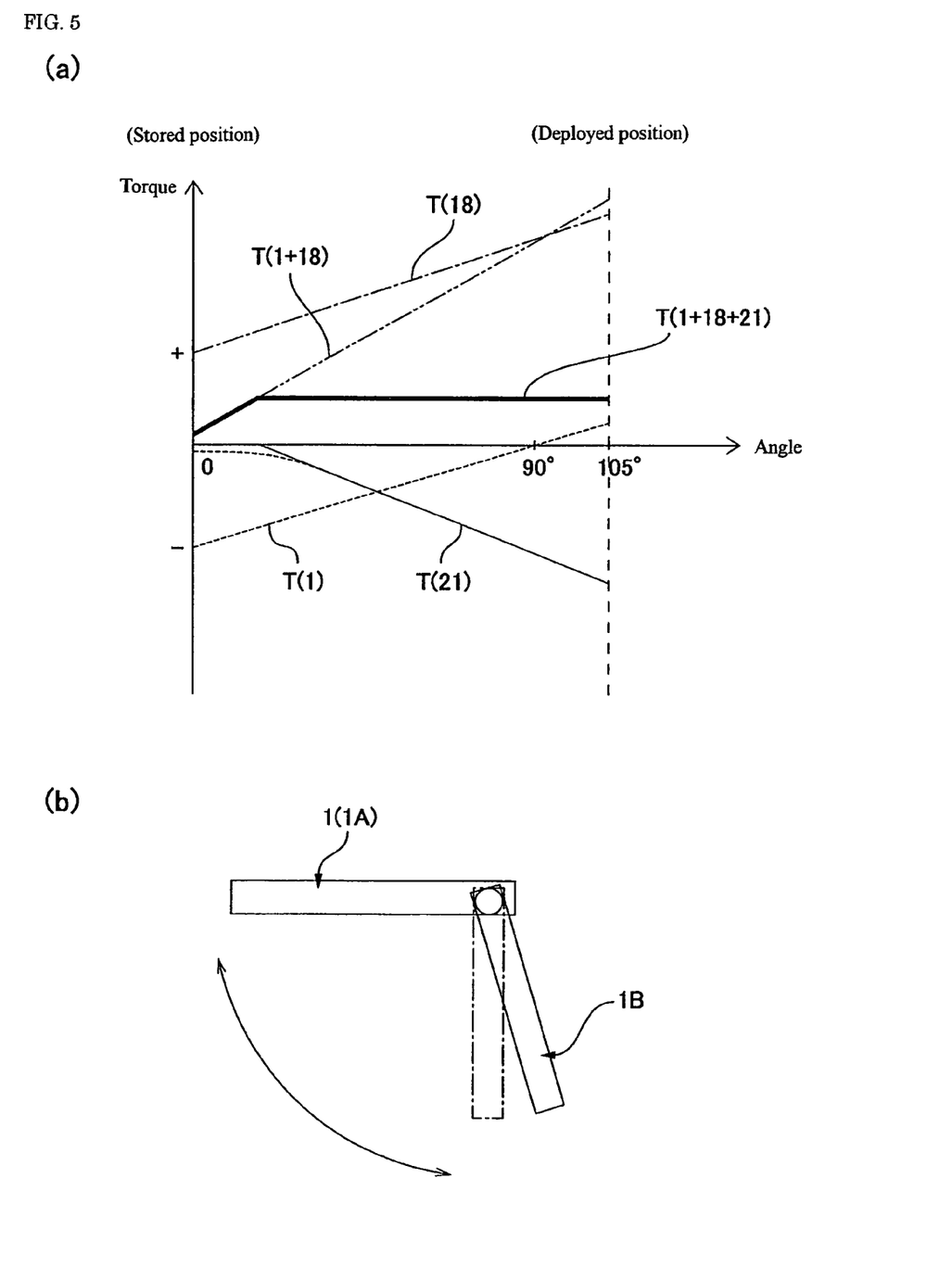
FIG. 5 is a graph for describing the torque that acts upon the liquid crystal display device.

In this instance, the liquid crystal display device 1 is in a substantially flat orientation when in a stored position 1A, and is in a substantially perpendicular orientation when in an opened position 1B, as shown in FIG. 5(b). Therefore, a torque T(1) based on the weight that turns the liquid crystal display device 1 in the opening direction is at a maximum in a closed state, is reduced as the display device is turned toward the deployed position 1B, and is at a minimum when the device is in the perpendicular orientation, as shown in FIG. 5(a). In contrast, the spiral spring will have the least number of coils (state of the initial number of coils) when the liquid crystal display device 1 is closed; therefore, the returning force T(18) of the spiral spring will be at a minimum. The number of coils will be at a maximum when the liquid crystal display device 1 reaches the deployed position 1B; therefore, the returning force T(18) will also be at a maximum. The returning force T(18) in the state of the initial number of coils must exceed the torque T(1) in the opening direction created by the weight of the liquid crystal display device 1 when in a closed state in order for the liquid crystal display device 1 to be returned to the stored position 1A by the spiral spring.

Configuring the returning force of the spiral spring in this manner poses a hazard in that a return torque T(1+18) that will be at maximum in the deployed position and decreases toward the stored position, will act on the device, so that the returning torque in the deployed position will become extremely high, and the liquid crystal display device 1 will slam shut.

A demand has arisen for a braking mechanism to be affixed to a retracting device of the liquid crystal display device 1 for applying a brake so that the liquid crystal display device will close at suitable speed. Braking mechanisms able to be used include hydraulic dampers, electromagnetic brakes, and gear dampers in which the braking force increases in proportion to the speed. However, problems are presented in that gear dampers comprise a plurality of gears, are configured so that frictional force increases with centrifugal force, involve a complex mechanism, and have poor reliability. Problems are also presented in that hydraulic dampers must be of a large size in order to maintain a prescribed braking force and are not suitable for being incorporated in retracting devices for liquid crystal display devices and the like. Problems further arise in that an electromagnetic brake or other electrical brake will not function during a power failure.

DISCLOSURE OF THE INVENTION

An object of the present invention is to provide a brake-equipped retracting device for a liquid crystal display device and other retractable members, which comprises a braking mechanism having a simple structure and high reliability.

To solve the forgoing problems, according to the present invention, there is provided a brake-equipped retracting device for a retractable member, characterized in comprising:

a motor for generating a rotational force for opening a retractable member from a stored position to an deployed position;

a returning spring member for returning the retractable member from the deployed position to the stored position by an elastic returning force generated by the elastic deformation, the degree of which increases in association with an action of opening the retractable member;

a rotating member for transmitting a rotational force of the motor and an elastic returning force of the returning spring member toward the retractable member;

a cord wound around the rotating member for restraining rotation of the rotating member; and a rotation-regulating mechanism for forcibly stopping rotation of the rotating member when the rotational speed of the rotating member exceeds a prescribed rotational speed, wherein the cord is adapted so that tensile force increases and the rotation-restraining force acting upon the rotating member increases in association with an action of opening the retractable member, whereas the tensile force decreases and the rotation-restraining force acting upon the rotating member decreases in association with an action of closing the retractable member; and the rotation-regulating mechanism has a centrifugal grip that can be moved by a centrifugal force generated in conjunction with rotation of the rotating member; a restricting spring member for restricting the movement of the centrifugal grip; and a stationary-side engaging part with which the centrifugal grip that has been moved by the centrifugal force in an amount equal to or greater than a prescribed amount can engage.

In the brake-equipped retracting device of the present invention, a cord is wound around the rotating member for transmitting the rotational force of the motor, and the tensile force of the cord is increased or decreased in relation to the opening and closing of the retractable member. Therefore, a retracting device can be realized that comprises a braking mechanism that is extremely simple but has a higher reliability and lower cost than when a gear damper or another existing braking mechanism is used. In the event that the cord breaks, the rotating member will rotate at a high rate and the retractable member will move quickly toward the stored position; however, the rotation-regulating mechanism will operate when the rotating member rotates at a high rate, and the rotation of the rotating member will be forcibly halted. Therefore, even if the cord breaks or another malfunction occurs, the retractable member can reliably be prevented from closing too quickly toward the stored position, and a highly safe retracting device can therefore be realized.

The rotation-regulating mechanism may function during the closing operation of the retractable member.

The rotational force of the motor may be transmitted to the rotating member via an electromagnetic clutch, and the electromagnetic clutch may be disengaged when the retractable member is returned to the stored position.

In order to prevent a large impact force from occurring when the rotation of the rotating member has been forcibly halted by the rotation-regulating mechanism or in other instances, the electromagnetic clutch, the rotation-regulating mechanism, and a slip clutch are preferably connected in the stated order to a rotational force transmission channel between the motor and the rotating member, and impact force is alleviated by allowing the slip clutch to slip.

The same type of slip mechanism can be incorporated in the rotation-regulating mechanism rather than or in addition to using the slip clutch. In this instance, the rotation-regulating mechanism may have a configuration that comprises a fixed member and a slip member attached to the fixed member in a state allowing the slip member to slip when acted upon by a force greater than or equal to a prescribed force, and a fixed-side engagement part is formed on the slip member.

In the brake-equipped retracting device of the present invention, the rotational movement of the rotating member is transmitted toward the retractable member via a link member that can turn about the rotating member between a rotational position that corresponds to the stored position and a rotational position that corresponds to the deployed position. In this instance, one end of the cord may be fixed directly or via a braking spring member in order to increase or decrease the tensile force of the cord with the opening and closing action of the retractable member while the other end of the cord is connected to the link member either directly or via a braking spring member. If the cord is pulled in conjunction with the turning of the link member, the degree of elastic deformation of the braking spring member will increase, the pulling force acting upon the cord will increase, and the rotation-restraining force of the rotating member will increase. In other words, the braking force will increase. Conversely, if the cord slackens, the degree of elastic deformation of the braking spring member will decrease, the pulling force acting upon the cord will decrease, and the rotation-restraining force (braking force) of the rotating member will decrease.

A central portion of the cord may be wound around a brake drum that is subjected to a rotation-restraining force by the braking spring member instead of having the braking spring member connected to an end of the cord.

In addition, a central portion of the cord may be wound around a tensile force-adjustment drum in order to adjust the tensile force acting upon the rotating member by the braking spring member or to adjust the amount of tensile force or the amount of slack of the cord accompanying the turning of the link member.

In the brake-equipped retracting device for a retractable member of the present invention, the cord is wound around the rotating member that transmits the rotational force of the motor, and the tensile force of the rope is increased and reduced in association with the opening and closing of the retractable member. A retracting device comprising a braking mechanism that is extremely simple, but also highly reliable and low in cost, can therefore be realized. In addition, the retracting device comprises a mechanical rotation-regulating mechanism that forcibly halts the rotation of the rotating member using centrifugal force. Therefore, if the cord breaks, the rotation-regulating mechanism functions as a backup brake, and the retractable member will not slam shut. An extremely safe retracting device can therefore be realized.

BEST MODE FOR CARRYING OUT THE INVENTION

A brake-equipped retracting device of a liquid crystal display device in which the present invention is used and which is provided to the ceiling of a passenger cabin of an airplane shall be described herein below with reference to the drawings.

(Overall Configuration)

Figure 1:
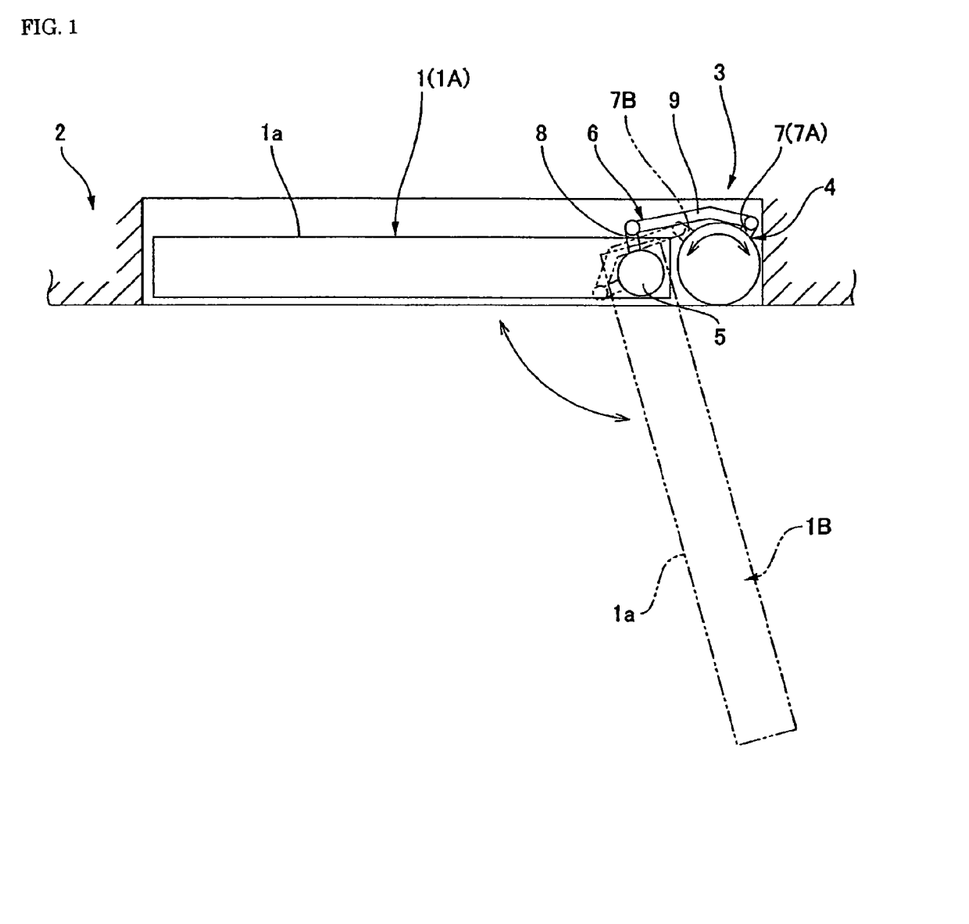
FIG. 1 is a diagram of an overall configuration showing a brake-equipped retracting device of a liquid crystal display device in which the present invention is employed.

FIG. 1 is a diagram of an overall configuration showing a brake-equipped retracting device of a liquid crystal display device. A liquid crystal display device 1 can be turned from a flat stored position 1A, indicated by the solid line, in which the device is stored in the ceiling 2 of the passenger cabin of an airplane, to an deployed position 1B, indicated by the imaginary line, in which the device is opened downward in an amount that is substantially 105°. A brake-equipped retracting device 3 of the liquid crystal display device 1 comprises a main body 4 of the mechanism, and a link mechanism 6 for converting the rotational movement of the main body 4 of the mechanism into a movement for retracting the liquid crystal display device 1 (a turning movement) about a turning central axis 5. The link mechanism 6 comprises, for example, a drive-side link 7 that is connected to the main body 4 of the mechanism side, a driven-side link 8 that is connected to the turning central axis 5 side of the liquid crystal display device 1, and an intermediate link 9 that bends at a slight angle and is connected between the drive-side link 7 and the driven-side link 8. The liquid crystal display device 1 is in the stored position 1A when the drive-side link 7 is in a first position 7A indicated by the solid line. The liquid crystal display device 1 reaches the deployed position 1B when the drive-side link 7 is turned to a second position 7B indicated by the imaginary line. A screen 1a of the liquid crystal display device 1 can be viewed from a seat when the liquid crystal display device 1 reaches the deployed position 1B.

Figure 2:
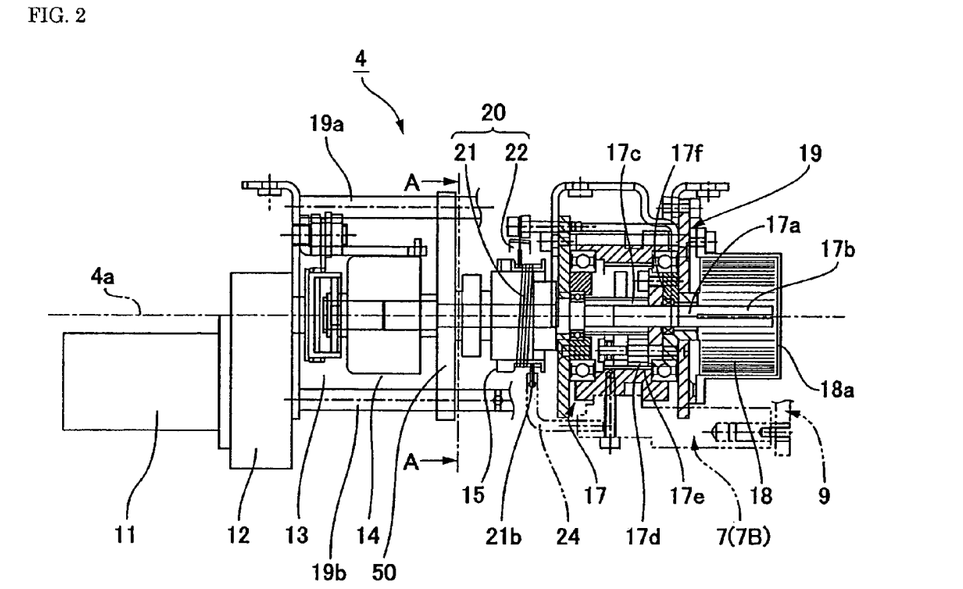
FIG. 2 is a diagram showing a main body of a mechanism of the brake-equipped retracting device of FIG. 1, and is a contour block diagram of a case in which the device has been cut along the central axis line.
Figure 3:
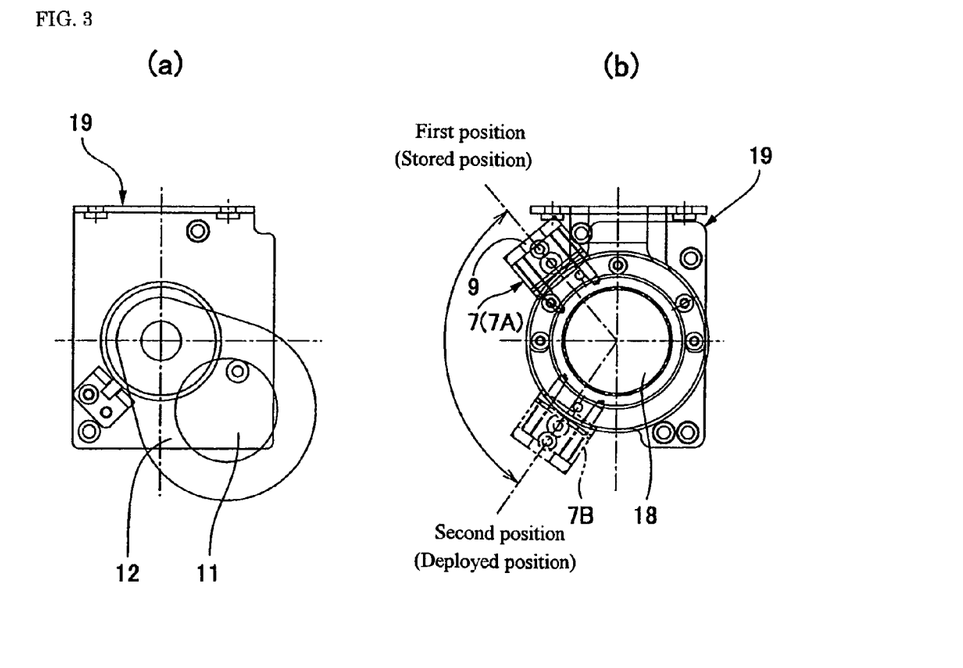
FIGS. 3(a) and 3(b) are an end view showing the rear end of the main body of the mechanism, and an end view showing the front end of the main body of the mechanism.
Figure 4:
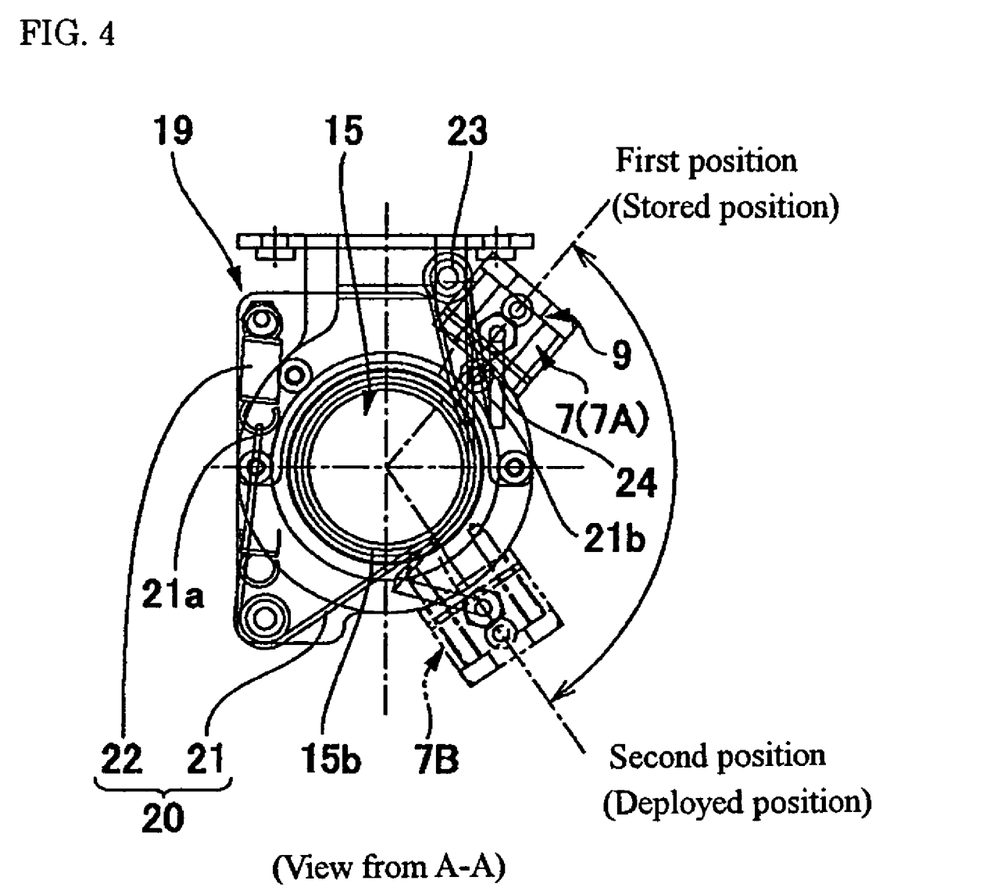
FIG. 4 is a perspective view as seen from the direction of the arrow A of FIG. 2.

FIG. 2 is a diagram showing the main body 4 of the mechanism of the brake-equipped retracting device 3 and is a contour block diagram of a case in which the device has been cut along the central axis line. FIGS. 3(a) and 3(b) are an end view showing the rear end of the main body 4 of the mechanism, and an end view showing the front end of the main body 4 of the mechanism. FIG. 4 is a perspective view as seen from the direction of the arrow A of FIG. 2.

With reference to these drawings, the main body 4 of the mechanism has a motor 11 on the rear end thereof, and the rotation of the motor 11 is transmitted via a row of reduction gears 12 to an input side of a one-way clutch 13 that is arranged along a central axis line 4a of the mechanism in a coaxial fashion. The one-way clutch 13, an electromagnetic clutch 14, a rotation-regulating mechanism 50, and a slip clutch 15 are arranged in the stated order in a coaxial fashion along the central axis line 4a of the mechanism from the rear end to the front end. The output side of the slip clutch 15 is connected to a rear end of an input shaft 17a of a coaxially arranged planetary gear reducer 17. A front end part 17b of the input shaft 17a protrudes to a prescribed length from the end face of the front end of the planetary gear reducer 17. An inner end of a spiral spring 18 that is coiled about the leading end 17b in a spiral shape is connected to the front end part 17b. An outer end of the spiral spring 18 is fixed to a cup-shaped case 18a that is fixed to a side of a mechanism frame 19.

The planetary gear reducer 17 comprises a sun gear 17c that is coaxially fixed to the input shaft 17a, an internal gear 17d that coaxially surrounds the sun gear 17c, and a plurality of planetary gears 17e that are disposed between the sun gear 17c and the internal gear 17d and that mesh with both gears. The planetary gears 17e are rotatably supported by a planetary carrier 17f. The planetary carrier 17f is fixed to the mechanism frame 19, and the internal gear 17d is rotatably supported by a front and rear pair of ball bearings. The internal gear 17d rotates counter to the input shaft 17a, and outputs a reduced-speed rotation. The drive-side link 7 of the link mechanism 6 is fixed to the outer peripheral surface of the internal gear 17d. The drive-side link 7 extends parallel to the central axis line 4a of the mechanism toward the front end, and one end of the intermediate link 9 is connected to the front end.

The liquid crystal display device 1 is in the stored position 1A when the drive-side link 7 is in the first position 7A indicated by the solid line; and the liquid crystal display device 1 reaches the deployed position 1B when the drive-side link 7 reaches the second position 7B indicated by the imaginary line. In other words, when the motor 11 is driven in a state in which the liquid crystal display device 1 is in the stored position 1A, the rotational force of the motor 11 is transmitted to the input shaft 17a of the planetary gear reducer 17, and the internal gear 17d, which is an output element of the rotational force, is rotated at a reduced rate. The rotational movement is converted to a movement that turns the liquid crystal display device 1 via the link mechanism 6, and the liquid crystal display device 1 begins to move toward the deployed position 1B. The spiral spring 18 is additionally caused to twist by the rotation of the input shaft 17a. When the liquid crystal display device 1 reaches the deployed position 1B, the motor 11 stops, and the liquid crystal display device 1 is kept in the deployed position 1B. The one-way clutch 13 and the slip clutch 15 are provided to prevent returning and to prevent overloading, respectively.

When the liquid crystal display device 1 that is in the deployed position 1B is closed (stored), the electromagnetic clutch 14 is disengaged and the connection between the motor 11 and the reducer 17 is severed. The input shaft 17a of the reducer 17 is connected to the spiral spring 18 and therefore begins to be rotated in reverse by the elastic returning force of the spiral spring 18 that is wound up when the liquid crystal display device 1 is opened. As a result, the internal gear 17d of the reducer 17 rotates in the opposite direction at a reduced rate, the drive-side link 7 that is attached to the internal gear 17d is turned toward the first position 7A, and the liquid crystal display device 1 therefore also begins to move gradually toward the stored position 1A. After the liquid crystal display device 1 has returned to the stored position 1A, the liquid crystal display device 1 is kept in the position by the elastic force of the spiral spring 18.

(Braking Mechanism)

As described with reference to FIG. 5(a), the torque T(1) that causes the liquid crystal display device 1 to rotate in the spread direction (opening direction) based on the weight of the liquid crystal display device 1 is at a maximum when the liquid crystal display device 1 is in a flat orientation in the closed state, and is zero when the liquid crystal display device 1 is in a perpendicular orientation (a 90°-rotated position) just before the stored position 1B. A low torque is generated in the opposite direction when the device is in the deployed position 1B. The returning torque that is needed to return the liquid crystal display device 1 from the deployed position to the stored position against the torque T(1) created by the weight increases toward the stored position 1A, and is ideally at a maximum in the stored position 1A. The liquid crystal display device 1 can thereby be returned to the stored position 1A according to a substantially constant torque.

However, the retuning torque T(18) produced by the spiral spring 18 is at a maximum in the deployed position 1B, gradually decreases toward the stored position 1A, and is at a minimum in the stored position 1A. The composite returning torque T(1+18) created by the weight and the spiral spring is extremely high in the deployed position 1B. This is undesirable in that, when the liquid crystal display device 1 is closed, the liquid crystal display device 1 quickly turns from the deployed position 1B toward the stored position 1A.

The retracting device 1 comprises a braking mechanism 20 for applying a brake to the turning. The braking mechanism 20 of the present example comprises a rope 21 made of Teflon (registered trademark) and a braking coil spring 22. As can be understood from FIG. 4, a rear end 21a of the rope 21 is connected to the braking coil spring 22, one end of which is connected to the mechanism frame 19. The rope 21 is drawn in the elongation direction of the braking coil spring 22, crossed over a pulley 23 that is attached to the mechanism frame 19, and subsequently wound multiple times around an outer peripheral surface 15b of a cylindrical case of the slip clutch 15 to which the input shaft 17a is connected. After being drawn from the outer peripheral surface 15b and crossed over a pulley 23, the rope 21 is further drawn in the opposite direction, and the distal end 21b of the rope 21 is connected to a distal end of a connecting bar 24 that is fixed to the drive-side link 7.

When the drive-side link 7 is in the first position (i.e., when the liquid crystal display device 1 is in the stored position 1A), the rope 21 will be maximally slack. Therefore, the braking coil spring 22 will be maximally compressed. When the drive-side link 7 is turned toward the second position, the rope 21 is accordingly pulled, the braking coil spring 22 gradually elongates, and the pulling force of the rope 21 increases. As a result, the rotation-restraining force (braking force) against the cylindrical case 15a of the slip clutch 15 around which the rope 21 is wound also increases.

The braking force against the slip clutch 15 produced by the rope 21 is at a maximum when the drive-side link 7 has reached the second position (i.e., when the liquid crystal display device 1 has reached the deployed position 1B), as indicated by the curved line T(21) of FIG. 5(a). Therefore, when the liquid crystal display device 1 is returned from the deployed position 1B to the stored position 1A, the input shaft 17a of the reducer is subjected to a large braking force from the slip clutch 15. The rotating input shaft 17a of the reducer is thus subjected to a braking force by the elastic returning force of the spiral spring 18, and the rotation rate of the input shaft 17a is reduced. In other words, a substantially constant torque acts as the returning torque, and the liquid crystal display device 1 is turned from the deployed position to the stored position at a substantially constant rate, as indicated by the curved line T (1+18+21) in FIG. 5(a).

In other words, the elastic returning force T(18) of the spiral spring 18 decreases because the spiral spring 18 gradually unwinds as the liquid crystal display device 1 approaches the stored position 1A. In contrast, the pull of the rope 21 gradually weakens as the liquid crystal display device 1 approaches the stored position 1A, and the braking force T(21) produced by the pulling force of the rope 21 therefore also gradually decreases. Therefore, when the liquid crystal display device 1 is to be stored, a substantially equal returning torque (1+18+21) acts on the device, and the liquid crystal display device 1 returns to the stored position 1A at a substantially constant rate.

In this way, in the brake-equipped retracting device 3 of the liquid crystal display device 1 of the present example, the rope 21 that is pulled by the coil spring 22 is wound around the slip clutch 15 that is connected to the input shaft 17a of the reducer; the braking force that is at a maximum when the liquid crystal display device 1 is in the deployed position is applied to the input shaft 17a of the reducer; the rope 21 slackens as the liquid crystal display device 1 is oriented from the deployed position to the stored position; and the braking force is reduced. Adopting a configuration that is extremely simple and low in cost therefore allows a prescribed braking force to be reliably applied, and a highly reliable retracting device to be realized.

An additional example of a braking mechanism that can be attached to the brake-equipped retracting device 3 shall next be described. FIGS. 6(a), 6(b), and 6(c) are views showing a main body 4 of the mechanism having the braking mechanism 20A. FIG. 6(a) is a contour block diagram of a case in which the main body is cut along the central axis line, FIG. 6(b) is a perspective view as seen from the direction of the arrow A, and FIG. 6(c) is a descriptive view of the braking mechanism. The basic configuration of the main body of the mechanism is the same as that of the main body 4 of the mechanism described above. Therefore, the same numeric symbols are applied to the corresponding regions, and descriptions thereof have been omitted.

Figure 6:
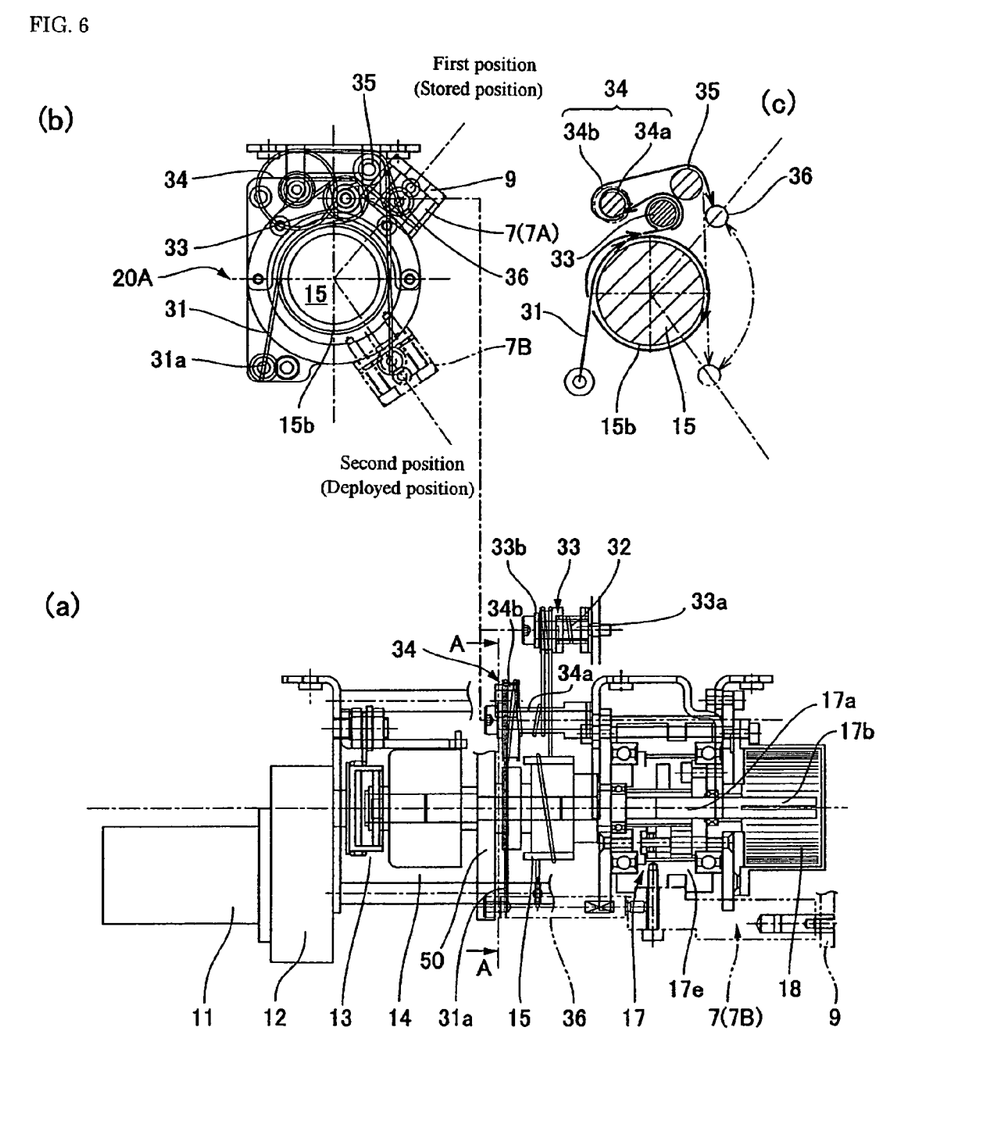
FIGS. 6(a), 6(b), and 6(c) are views showing a main body of the mechanism having a braking mechanism in which the present invention is employed, FIG. 6(a) being a contour block diagram of a case in which the main body is cut along the central axis line, FIG. 6(b) being a perspective view as seen from the direction of the arrow A, and FIG. 6(c) being a descriptive view of the braking mechanism.

The braking mechanism 20A of the main body of the mechanism of the present example comprises a Teflon rope 31, a braking force adjustment drum 33 that comprises a braking coil spring 32, and a tensile force adjustment drum 34. As can be understood from FIG. 6, a rear end 31a of the rope 31 is fixed to a mechanism frame 19, drawn therefrom, wound around an outer peripheral surface 15b of a slip clutch 15, and subsequently wound multiple times around the braking adjustment drum 33. The rope 31 is then drawn therefrom, wound around a small-diameter drum 34a and a large-diameter drum 34b of the tensile force adjustment drum 34, drawn across a pulley 35, and subsequently connected to a connecting bar 36 on the drive-side link 7.

The braking adjustment drum 33 comprises a spindle 33a fixed to the mechanism frame 19 and a drum main body 33b rotatably supported by a distal end of the spindle 33a. The drum main body 33b is fixed to the distal end of the braking coil spring 32 that is disposed surrounding the spindle 33. The rear end of the braking coil spring 32 is fixed to the spindle 33a or the mechanism frame 19.

When the drive-side link 7 is turned from the first position 7A to the second position 7B, the rope 31 is accordingly pulled. As a result, the portion that is wound around the tensile force adjustment drum 34 is unwound, the coil spring 32 is accordingly wound, and the pulling force of the rope 31 therefore also increases. When the drive-side link 7 has reached the second position 7B, the pulling force acting upon the rope 31 also reaches a maximum and, therefore, the braking force (rotation-restraining force) acting upon the input shaft 17a of the reducer via the slip clutch 15 around which the rope 31 is wound also reaches a maximum. When the drive-side link 7 begins to return from the second position 7B to the first position 7A, the rope 31 slackens, the coil spring 32 accordingly unwinds, and the pulling force acting upon the rope 31 decreases. As a result, the braking force acting upon the input shaft 17a of the reducer also begins to decrease.

Therefore, the braking mechanism 20A of the present example functions in the same manner as the braking mechanism 20 of the main body 4 of the mechanism described above, and the liquid crystal display device 1 can be returned from the deployed position 1B to the stored position 1A at a substantially uniform rate.

In addition, in the braking mechanism 20A of the present example, an intermediate portion of the rope 31 is wound around the tensile force adjustment drum 34. The degree to which the rope 31 is pulled or made slack, and the tensile force generated in conjunction with the turning of the drive-side link 7, can be adjusted by changing the diameter of, e.g., the large-diameter drum 34b of the tensile force adjustment drum 34. The braking force can therefore readily be adjusted.

(Rotation-regulating Mechanism)

The rotation-regulating mechanism 50 that is connected between the slip clutch 15 and the one-way clutch 13 functions as a backup brake if the rope 21 slips off or breaks when the liquid crystal display device 1 returns from the deployed position 1B to the stored position 1A. If the rope 21 slips off or breaks, a braking force will not be produced by the rope 21, and a hazard is therefore presented in that the liquid crystal display device 1 will slam shut from the deployed position 1B to the stored position 1A. If the slip clutch 15 rotates quickly, the rotation of the slip clutch 15 will be forcibly halted without the use of a braking force by the action of the rotation-regulating mechanism 50 that is connected to the slip clutch, and the movement of the liquid crystal display device 1 will be stopped.

Figure 7:
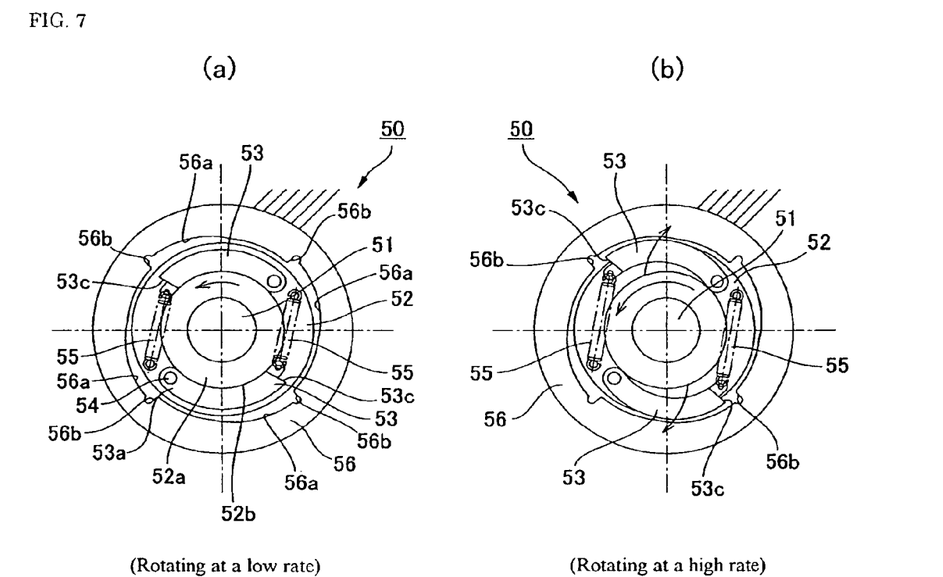
FIGS. 7(a) and 7(b) are descriptive views showing the rotation-regulating mechanisms of FIGS. 3 and 6, with FIG. 7(a) showing a normal state, and FIG. 7(b) showing a state during high-speed rotation (during an abnormality)

FIG. 7 is a descriptive view showing the configuration of the rotation-regulating mechanism 50 of the present example. The rotation-regulating mechanism 50 comprises a rotating shaft 51 coaxially connected to the slip clutch 15, and a rotating plate 52 is concentrically fixed to the rotating shaft 51 so as to rotate integrally. An annular boss 52a is formed on a central portion of the rotating plate 52, and two centrifugal grips 53, 53 are attached to end faces of the rotating plate 52 to be positioned on the outer peripheral side of the boss 52a at both ends in the diametric direction.

The centrifugal grip 53 is an arched plate of fixed width spanning a substantially 90° angle. The grip can be turned in the radial direction along an end face of the rotating plate 52 about a spindle 54 that is attached to one end 53a of the centrifugal grip 53. A coil spring 55 (restraining spring member) bridges the gap between the other end 53b of the centrifugal grip 53 and the rotating plate 52. The centrifugal grip 53 is normally pulled toward the inside in the radial direction by the springing force of the coil spring 55 and is pressed to a circular outer peripheral end face 52b of the boss 52a of the rotating plate.

An annular fixed casing 56 that concentrically surrounds the rotating plate 52 is disposed on the outside of the rotating plate 52. The annular fixed casing 56 is a stationary side member that is fixed to connecting rods 19a, 19b (see FIG. 2) attached to the mechanism frame 19 of the main body 4 of the mechanism. Curved incisions 56a are formed on the inner peripheral surface of the annular fixed casing 56 at 90° angular intervals so that the centrifugal grip 53 can turn toward the outer peripheral side by a prescribed amount. The incisions 56a become deeper toward one side in the circumferential direction, and engagement notch surfaces 56b that extend in a radial direction are formed between the incisions 56a. When the centrifugal grip 53 turns outward in the radial direction to an extent equal to or greater than a prescribed amount, a distal end face 53c of the centrifugal grip 53 will be able to contact the engagement notch surfaces 56b (stationary-side engaging parts).

The operation of the rotation-regulating mechanism 50 having the above configuration shall be described hereunder. When the rotating shaft 51 is rotating normally (rotating at a low rate), the centrifugal grips 53 are pulled by the coil spring 55, as shown in FIG. 7(a), and are pressed to the circular outer peripheral end face 52b of the boss 52a of the rotating plate 52.

A brake will not be applied if the braking rope 21 slips off, breaks, or otherwise malfunctions when the liquid crystal display device 1 is closed from the deployed position 1B to the stored position 1A, and the rotating shaft 51 will therefore rotate at a high rate. If the rotating shaft 51 rotates at a high rate, the centrifugal force acting upon the centrifugal grips 53 will exceed the springing force of the coiled spring 55, and the centrifugal grips 53 will turn about the spindle 54 toward the outer peripheral side. As a result, the distal end faces 53c of the centrifugal grips 53 will strike the engagement notch surfaces 56b of the fixed casing 56, and the rotation of the rotating shaft 51 will be forcibly halted, as shown in FIG. 7(b). The liquid crystal display device 1 can thereby be prevented from slamming shut even in cases such as when the rope 21 breaks, and safety can be maintained.

Figure 8:
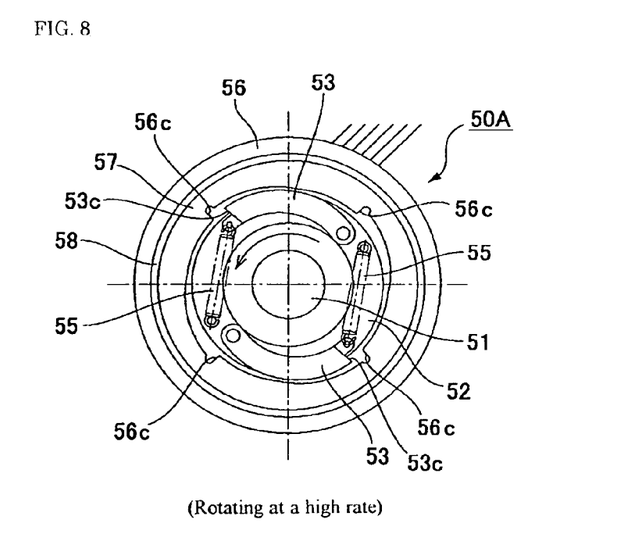
FIG. 8 is a descriptive view showing a modified example of the rotation-regulating mechanism of FIG. 7.

To alleviate the impact force when the rotating shaft 51 is forcibly halted, a rotation-regulating mechanism 50A may be used in which a slip casing 57 is attached to the fixed casing 56, and an engagement notch surface 56c is formed on the inner peripheral surface of the slip casing 57, as shown in FIG. 8. The slip casing 57 is attached to the fixed casing 56 via a slip element 58, and can slip and rotate against the fixed casing 56 when a torque that is equal to or greater than a prescribed amount is applied. When the rotating shaft 51 is forcibly halted, the slip casing 57 slips and the impact force resulting from the centrifugal grips 53 striking the engagement notch surfaces 56b is alleviated.

When a rotation-regulating mechanism 50A having such a slipping function is used, the slip clutch 15 can also be dispensed with. In such instances, the rope 21 may be wound around a rotating member that is connected between the input shaft 17a of the planetary gear reducer 17 and the rotation-regulating mechanism 50A.

In addition, when the rotation-regulating mechanism 50A has such a slipping function, the liquid crystal display device 1 can be stored by being manually pushed in the closing direction when the rotation-regulating mechanism 50A operates and the liquid crystal display device 1 stops in an intermediate position.

The rotation-regulation mechanisms 50, 50A shown in FIGS. 7 and 8 function when an abnormality occurs while the liquid crystal display device 1 is being closed. A centrifugal grip that is moved by the effect of a centrifugal force when the rotating shaft 51 rotates in the opposite direction, and an engagement notch surface formed in a position whereby the centrifugal grip can be engaged when moving, may be provided to allow the liquid crystal display device 1 to be forcibly halted when an abnormality occurs while the liquid crystal display device 1 is being opened (i.e., opened from the stored position to the deployed position).

OTHER EMBODIMENTS

The present invention can also be used in a brake-equipped retracting device for retracting a retractable member of an object other than a liquid crystal display device disposed on the ceiling of an airplane.

A Teflon rope was used as the cord for generating the braking force in the above-described example. However, a rope or cord composed of a different material or a wire can also be used.

If a rope composed of Teflon or another material is used, and the rope has been impregnated with grease, a prescribed braking force can be maintained by the viscosity of the grease when the rope is loosened. Changes over time in the tensile force of the rope can also be suppressed, the tensile force of the rope can be readily adjusted, and other such advantages can be obtained.

Still further, in the above-described example, when the one-way clutch is disposed on the slip clutch 15 in a concentric fashion, the following effects can be obtained. Specifically, a reduction can be achieved in the load on the motor caused by the braking force when the liquid crystal display device 1 is deployed, and looseness due to the unwinding of the cord for generating the braking force can be prevented.

The invention claimed is:

1. A brake-equipped retracting device for a retractable member, comprising:
    a motor for generating a rotational force for opening a retractable member from a stored position to a deployed position;
    a returning spring member for returning the retractable member from the deployed position to the stored position by an elastic returning force generated by an elastic deformation thereof, wherein the degree of the elastic deformation increases in association with an action of opening the retractable member;
    a rotating member for transmitting a rotational force of the motor and an elastic returning force of the returning spring member toward the retractable member;
    a cord wound around the rotating member for restraining rotation of the rotating member; and
    a rotation-regulating mechanism for forcibly stopping rotation of the rotating member when a rotational speed of the rotating member exceeds a prescribed rotational speed, wherein
    the cord is adapted so that tensile force increases and the rotation-restraining force acting upon the rotating member increases in association with an action of opening the retractable member, whereas the tensile force decreases and the rotation-restraining force acting upon the rotating member decreases in association with an action of closing the retractable member; and the rotation-regulating mechanism has a centrifugal grip that can be moved by a centrifugal force generated in conjunction with rotation of the rotating member; a restricting spring member for restricting the movement of the centrifugal grip; and a stationary-side engaging part with which the centrifugal grip that has been moved by the centrifugal force in an amount equal to or greater than a prescribed amount can engage.

2. The brake-equipped retracting device for a retractable member according to claim 1, wherein the rotation-regulating mechanism operates while the retractable member is closing.

3. The brake-equipped retracting device for a retractable member according to claim 1, wherein an electromagnetic clutch, the rotation-regulating mechanism, and a slip clutch are connected in the stated order to a rotational-force transmission channel between the motor and the rotating member; and the electromagnetic clutch is switched to a disengaged state when the retractable member is returned to the stored position.

4. The brake-equipped retracting device for a retractable member according to claim 1, wherein the rotation-regulating mechanism comprises:

a fixed member; and a slip member mounted to the fixed member so as to be able to slip when a force greater than or equal to a prescribed force is applied; wherein the stationary-side engaging part is formed on the slip member.

5. The brake-equipped retracting device for a retractable member according to claim 4, wherein an electromagnetic clutch and the rotation-regulating mechanism are series connected to a rotational-force transmission channel between the motor and the rotating member; and the electromagnetic clutch is switched to a disengaged state when the retractable member is returned to the stored position.

6. The brake-equipped retracting device for a retractable member according to claim 1, wherein the rotating member includes a link member that can turn about the rotating member between a rotational position that corresponds to the stored position and a rotational position that corresponds to the deployed position in order to transmit rotational movement of the rotating member toward the retractable member; wherein:

one end of the cord is connected and fixed to a prescribed position either directly or via a spring member; and the other end of the cord is connected to the link member either directly or via a spring member.

7. The brake-equipped retracting device for a retractable member according to claim 6, wherein a middle portion of the cord is wound around a tensile force-adjustment drum.

8. The brake-equipped retracting device for a retractable member according to claim 1, wherein the rotating member includes a link member that can turn about the rotating member between a rotational position that corresponds to the stored position and a rotational position that corresponds to the deployed position in order to transmit rotational movement of the rotating member toward the retractable member; and a brake drum that is subjected to a rotation-restraining force by the spring member; wherein:

one end of the cord is connected and fixed to a prescribed location, while the other end of the cord is connected to the link member; and one portion of the cord is wound around the brake drum.

* * * * *

UNITED STATES PATENT AND TRADEMARK OFFICE
CERTIFICATE OF CORRECTION

Page 1 of 1

PATENT NO. : 7,686,141 B2
APPLICATION NO. : 11/628422
DATED : March 30, 2010
INVENTOR(S) : Norio Shirokoshi et al.

It is certified that error appears in the above-identified patent and that said Letters Patent is hereby corrected as shown below:

On the title page of the Patent, please change the Assignees from item (73)    Assignees:   Harmonic Ad, Inc., Azumino-shi (JP);
                                     Matsushita Electric Industrial Co., Ltd., Kadoma-shi (JP)

to item (73)    Assignees:   Harmonic Ad, Inc., Azumino-shi (JP);
                                     Panasonic Corporation, Kadoma-shi (JP)

Signed and Sealed this
Twenty-ninth Day of September, 2015

Michelle K. Lee
*Director of the United States Patent and Trademark Office*